Feb. 24, 1942.     H. J. SAUER     2,274,217

VEHICLE LAMP

Filed Sept. 14, 1939

INVENTOR
HENRY J. SAUER.
BY
ATTORNEY

Patented Feb. 24, 1942

2,274,217

UNITED STATES PATENT OFFICE 2,274,217

VEHICLE LAMP

Henry J. Sauer, Fairfield, Conn., assignor to The Kilborn-Sauer Company, Fairfield, Conn., a corporation of Connecticut Application September 14, 1939, Serial No. 294,829

1 Claim. (Cl. 240—7.1)

The present invention relates to an improvement in vehicle lamps and particularly a warning lamp of the type adapted to be mounted on the rear ends of trucks, trailers, or the like, as a tail or clearance lamp. The improved lamp is of the particular type in which there is a flexible connection between the attaching bracket and the lamp proper, which permits the lamp to swing slightly while the vehicle is in motion, thus increasing its visibility and warning effect, and also protects it against breakage in case it is bumped into, the flexible connection allowing the lamp to swing back with or ride any impact against it.

An object of the invention is to provide a lamp structure in which the flexible connection between the attaching bracket and lamp proper consists of a relatively short flexible strap member connected to the bracket and a vertical rigid extension member connected to the lamp, this rigid element adapted to receive the lower end of the flexible strap member in a manner to position and connect it against angular displacement, protect it against contact with extraneous objects, and seal it against the deteriorating effect of mud, water and the like.

A further object is to provide a rigid extension connection member secured to the lamp, which forms a reinforcement therefor, and which in the case of impact against the lamp will not tend to loosen the connection of the lamp with said connection member, and to provide the lower end of the flexible strap member a substantially greater distance above the lamp than has been the case in vehicle lamps of this general type heretofore in use.

A further object is to provide improved electrical connection means between the bracket and the rigid connection member, and in which the ends of the electrical connection are securely and permanently clamped and enclosed, thereby insuring reliable electrical contact and protection of the connections against deterioration from mud, water or the like, the connection being such that the contact ends are effectually sealed and closed against the entrance of such mud, water, or the like.

With the above and other objects in view, an embodiment of the invention is shown in the accompanying drawing, and this embodiment will be hereinafter more fully described with reference thereto, and the invention will be finally pointed out in the claim.

In the drawing.

Similar reference characters indicate corresponding parts throughout the several figures of the drawing.

Figure 1:
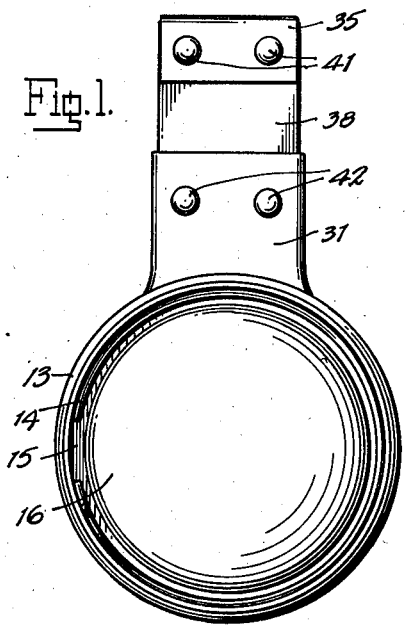
Fig. 1 is a front elevation of a vehicle lamp, according to the exemplary illustrated embodiment of the invention.
Figure 2:
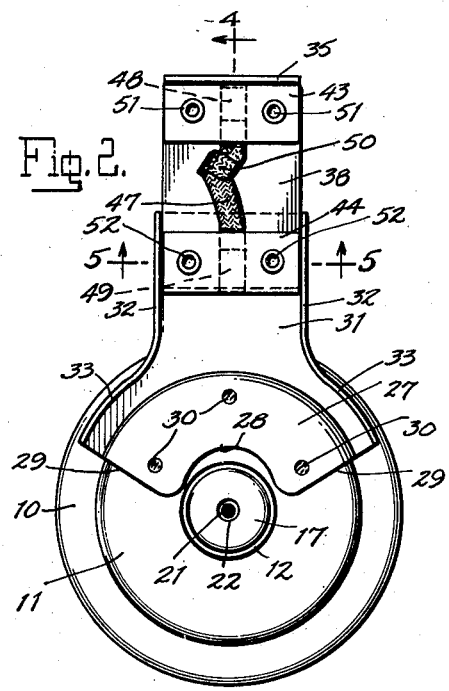
Fig. 2 is a rear elevation.
Figure 3:
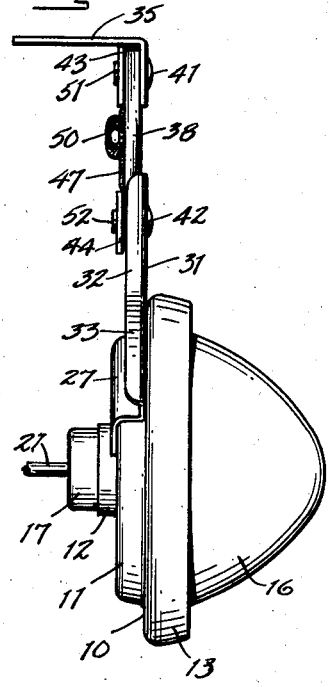
Fig. 3 is a side elevation.
Figure 4:
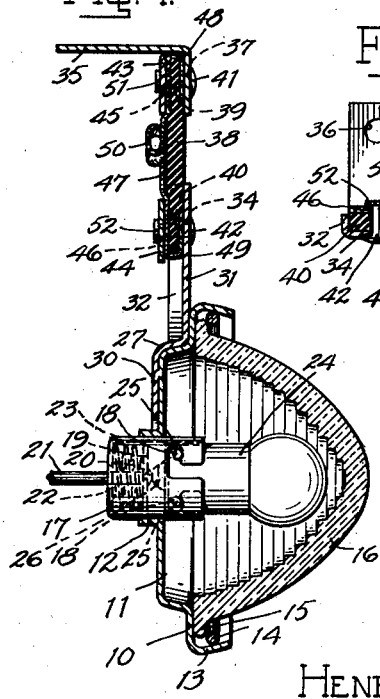
Fig. 4 is a vertical sectional view, taken along the line 4—4 of Fig. 2.
Figure 5:
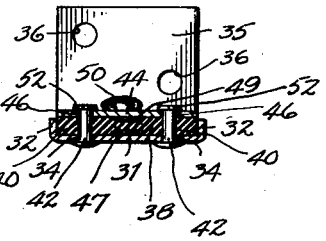
Fig. 5 is a horizontal sectional view, taken along the line 5—5 of Fig. 2.

Referring to the drawing, the vehicle lamp, according to the exemplary illustrated embodiment of the invention, comprises a lamp back or casing member 10, having an annular rearwardly embossed offset portion 11 provided with a central lamp socket receiving opening formed by a rearwardly extending cylindrical flange 12. A forwardly projecting inwardly converging rim 13 is formed upon the casing member for the purpose of receiving the split spring retaining ring 14, which engages the base flange 15 of the lens 16 to retain the latter in place, the ring being removable for the purpose of removing the lens to replace burned out bulbs.

The lamp socket shell 17 is pressed into the cylindrical flange 12 with a force fit to retain it in place, this shell being provided at its inner portion with bayonet slots 18—18, and provided within its outer portion with an insulation disc 19 having a center contact button 20 connected to a conductor wire 21 extending rearwardly through the aperture 22 in the base of the shell, a spring 23 being disposed between the base of the shell and the disc 19. The lamp base 24 provided with diametrically opposed pins 25—25 is engaged in the socket in the usual manner by turning the pins 25 into the bayonet slots 18, the spring 23 maintaining this connection and also pressing the contact button 20 into engagement with the center contact 26 of the lamp base.

To the rearward side of the lamp casing there is secured a rigid vertically disposed extension and connection member, consisting of a lower cape portion 27 shaped to fit over the upper part of the rearwardly embossed back of the casing, its lower edge being cut out, as at 28, to extend around the flange 12 and inclined outwardly and upwardly from each side of the cut-out 28, as at 29—29. The cape portion 27 is rigidly secured to the lamp casing by spot-welding, as at 30. It will be understood that rivets or other suitable securing means may be employed if desired. A vertical extension 31 projects upwardly from the cape portion and is provided at its vertical edges with rearwardly bent parallel flanges 32—32, these flanges being extended at their lower ends into downwardly and outwardly curved flanges 33—33 following the outline of the cape portion. The flanges 32 are adapted, as will presently more fully appear, to position and protect the flexible strap member, and these flanges 32 together with their extension flanges 33, impart great rigidity to the connection member, so that relatively thin sheet metal may be employed in its construction, and at the same time there will be no likelihood of it becoming distorted through impact therewith. Near the upper end of the extension 31 there are provided holes 34 to receive the attaching rivets for the lower end of the flexible strap member, as will presently more fully appear.

A right angle shaped attaching bracket member 35 is provided in its upper portion with holes 36 to receive attaching screws to secure the lamp to the truck or trailer structure, its forward downwardly bent vertical portion being provided with holes 37 to receive the attaching rivets for the upper end of the flexible strap member, as will presently more fully appear.

The flexible connection consists of a length of flexible strap 38, of rectangular form, its width dimension being such as to be received within the upper end of the extension member 31 with the vertical edges of the strap positioned and confined by the flanges 32. The flexible strap 38 may be formed of any suitable material, but is preferably formed of tough impregnated fabric similar to brake lining material, this fabric being such as to provide the necessary strength, flexibility, and resistance to wear and the deteriorating effect of mud and water. The upper end of the strap is engaged within the bracket 35, its forward face being in contact with the rearward face of the vertical downwardly extending portion of the bracket. The upper and lower ends of the strap are respectively provided with holes 39 and 40 registering with the holes 37 and 34 of the bracket and extension member respectively, and attaching rivets 41 and 42 are engaged through these holes and through clamping strips or plates 43 and 44, respectively provided with rivet holes 45 and 46.

Before securing the rivets and the clamping plates an electrical conductor wire 47 is arranged in relation to the flexible strap member in order to electrically connect the bracket 35 to the extension member 31, and thus complete the ground connection of the lamp to the vehicle body. This wire is preferably a flat woven ribbon like copper strand cable and its ends are folded about the upper and lower ends of the strap 38, as at 48 and 49, while its intermediate portion is provided with a loop 50, so that excessive flexing of the strap 38 will not impose strain upon it. With the ends of the wire folded about the ends of the strap the clamping plates 43 and 44 are tightly secured by riveting over the ends of the rivets, as at 51 and 52, sufficient pressure being exerted to embed the connections in the strap to seal them against the entrance of mud and water, and at the same time insuring a positive contact between the wire and the metallic bracket 35 and extension 31.

It will be noted that through the inter-position of the rigid extension member 31 the connection of the flexible strap to the lamp is at a point substantially above the lamp, so that a substantially shorter strap is employed than heretofore, which has the advantage of reducing the amount of material which may be subject to deterioration through constant movement and the effects of weather, and the connection of the flexible member is protected against direct strain in the event of impact with the lamp.

I have illustrated and described a preferred and satisfactory embodiment of the invention, but it will be obvious that changes may be made therein, within the spirit and scope thereof, as defined in the appended claim.

Having thus described my invention, what I claim and desire to secure by Letters Patent is:

A flexibly mounted vehicle lamp, comprising a lamp assembly including a circular casing having an annular lens abutting marginal back portion, an annular forwardly projecting peripheral lens retaining rim flange portion, a rearwardly offset back portion, and a rearwardly projecting annular shoulder connecting the inner edge of said marginal back portion to the outer edge of said rearwardly offset back portion, a rigid extension member including an upper vertically disposed portion engaged with the rearward side of said marginal back portion and projecting upwardly from the casing, and a lower shouldered cape portion in the form of a section of a circle fitted to the upper part only of said rearwardly projecting annular shoulder and extending downwardly over said rearwardly offset back portion, circumferential marginal portions continuous and in the same vertical plane with said vertically disposed portion and surrounding said shouldered cape portion at each side, and a rearwardly extending flange extending continuously along each of the vertical edges of said vertically disposed portion and the circumferential edge of said circumferential marginal portions continuous therewith, means rigidly securing said cape portion to said rearwardly offset back portion against relative turning movement, an attaching bracket, and a flexible connection member secured at its upper end to said attaching bracket and secured at its lower end to said upper portion of said extension member.

HENRY J. SAUER.